(12) United States Patent
Browne et al.

(10) Patent No.: US 7,845,709 B2
(45) Date of Patent: Dec. 7, 2010

(54) ACTIVE MATERIAL ACTUATED FLOW TRIPS

(75) Inventors: Alan L. Browne, Grosse Pointe, MI (US); Nancy L. Johnson, Northville, MI (US); Guillermo A. Herrera, Winnetka, CA (US); Geoffrey P. Mc Knight, Los Angeles, CA (US); Christopher P. Henry, Newbury Park, CA (US); Andrew C. Keefe, Encino, CA (US); Bahram Khalighi, Troy, MI (US); Douglas M. Smick, Warner Robins, GA (US)

(73) Assignee: GM Global Technology Operations, Inc., Detroit, MI (US)

( * ) Notice: Subject to any disclaimer, the term of this patent is extended or adjusted under 35 U.S.C. 154(b) by 739 days.

(21) Appl. No.: 11/744,966

(22) Filed: May 7, 2007

(65) Prior Publication Data
US 2008/0100071 A1    May 1, 2008

Related U.S. Application Data

(60) Provisional application No. 60/855,869, filed on Oct. 31, 2006.

(51) Int. Cl.
*B60J 1/20* (2006.01)
(52) U.S. Cl. .................................. 296/180.5
(58) Field of Classification Search .... 296/180.1–180.5
See application file for complete search history.

(56) References Cited

U.S. PATENT DOCUMENTS

| 6,979,050 | B2 * | 12/2005 | Browne et al. | 296/180.5 |
| 2006/0012191 | A1 | 1/2006 | Brei et al. | 292/341.17 |
| 2007/0216194 | A1 * | 9/2007 | Rober et al. | 296/180.1 |
| 2008/0178526 | A1 * | 7/2008 | Browne et al. | 49/82.1 |
| 2008/0272615 | A1 * | 11/2008 | McKnight et al. | 296/180.5 |
| 2009/0058130 | A1 * | 3/2009 | Ukpai et al. | 296/146.9 |

* cited by examiner

*Primary Examiner*—Hillary Gutman (57) ABSTRACT

A vehicle flow trip, includes a moveable body portion in physical communication with a vehicle body, and an actuator comprising an active material in operative communication with the vehicle body and the moveable body portion; wherein the active material undergoes a change in a property upon receipt of an activation signal, wherein the change in a property is effective to displace the moveable body portion from either an original position or a deployed position in an airflow stream to the other of the original or the deployed position through motion of the actuator.

9 Claims, 7 Drawing Sheets

ACTIVE MATERIAL ACTUATED FLOW TRIPS

CROSS REFERENCE TO RELATED APPLICATIONS

The present application relates to and claims the benefit of priority to U.S. Provisional Application No. 60/855,869 filed Oct. 31, 2006, incorporated herein by reference in its entirety.

BACKGROUND

The present disclosure generally relates to active material based reversibly deployable flow trips, and in particular, in terms of one embodiment, to flow trips having active material based hinges as rotary actuators.

Airflow over, under, around, and/or through a vehicle can affect many aspects of vehicle performance including vehicle drag, vehicle lift and down force, and underhood and brake cooling. Vehicle aerodynamic drag, for instance, is inversely proportional to vehicle fuel economy. Numerous systems and devices have been created to improve vehicle aerodynamics, reduce vehicle drag, and therefore increase fuel economy. Some of the original devices to control airflow relative to a vehicle were generally of a non-adjustable geometry, location, and orientation. Such devices generally do not adapt as driving conditions change, thus the airflow relative to the vehicle cannot be adjusted with such fixed devices to better suit changes in driving conditions.

Later developments in vehicle airflow include adjustable control devices. Such devices are adjustable by connecting the devices to hydraulic, mechanical, or electrical actuators. For example, some vehicle spoilers may adjust location and/or orientation in response to an actuator signal. Such actuators, however, generally require additional components such as pistons, motors, solenoids and/or like mechanisms for activation, which increase the complexity of the device often resulting in an increased number of failure modes, increased weight, and increased maintenance and manufacturing costs.

Active materials such as shape memory alloys, piezoelectrics, magnetorheological polymers, electroactive polymers, and the like, can be used as limited displacement actuators. The use of active material actuators in place of mechanical actuators such as solenoids, servo-motors, and the like, minimizes the complexity associated with these types of actuators. Moreover, these materials generally provide lightweight alternatives, minimize packaging space, and provide lower acoustic and electromagnetic field (EMF) outputs during operation. However, these materials provide limited displacement and generally do not provide rotation directly. In order to provide large displacements required in many flow trip and other applications, known active material actuators that achieve small displacements could be actuated repetitively to incrementally, in multiple small steps, achieve the desired large displacement. The drawbacks of achieving large rotational displacements in such an incremental manner are that the active material actuators become more complex and the time required to achieve full deployment is dramatically increased Accordingly, there is a need for an improved active material actuated flow trip. It is to be recognized that a particular advantage of active flow trips is that in their deployed state at high vehicle speeds they improve aerodynamics, thereby reducing drag and increasing fuel economy, while in their stowed state when the vehicle is either stationary or being driven at low speeds, they preserve the body lines intended by vehicle designers.

BRIEF SUMMARY

In one embodiment, a vehicle flow trip, includes a moveable body portion in physical communication with a vehicle body, and an actuator comprising an active material in operative communication with the vehicle body and the moveable body portion; wherein the active material undergoes a change in a property upon receipt of an activation signal, wherein the change in a property is effective to displace the moveable body portion from either an original position or a deployed position in an airflow stream to the other of the original or the deployed position through motion of the actuator.

An active actuator-hinge assembly for a vehicle flow trip, includes a linear displacement active material disposed in an actuator covering, wherein the active material is configured to undergo a change in a property upon receipt of an activation signal, a radial output shaft in operative communication with the linear displacement active material, wherein the change in the property of the active material is effective to axially move the radial output shaft, and a pivot assembly, in operative communication with the radial output shaft and the actuator covering, configured to convert the axial movement of the output shaft to a rotational motion of the actuator covering.

A process for using a vehicle flow trip, includes disposing an actuator comprising an active material intermediate a vehicle body and a moveable body portion, activating the active material to effect a change in a property of the active material, wherein the change in a property displaces the moveable body portion from either of an original position or a deployed position in a vehicle airflow stream to the other of the original or the deployed position through motion of the actuator, and deactivating the active material.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Active material actuated flow trips and processes for reversible deployment of an active material actuated flow trip are disclosed herein. In contrast to prior art flow trips, the flow trips and methods disclosed herein advantageously use active material based mechanisms to deploy when a vehicle is moving and maintain flush vehicle body lines when the vehicle is stationary, based variously on active material linear and/or rotary actuators. Moreover, the actuators are capable of large displacements with minimal actuation time, thereby providing faster total response times than the prior art of large displacement active material based actuators, which require multiple activations to achieve full displacements. As used herein, the term "vehicle body" generally refers to parts of the vehicle onto which the flow trip may be moveably attached, and includes, without limitation, wheel wells, body panels, the hood, rear fascia, the roof, bumpers, chassis, frame and sub-frame components, pillars, and the like. In a preferred embodiment, the flow trip is operatively connected to the vehicle body, such as a wheel well.

The term "active material" as used herein generally refers to a material that exhibits a change in a property such as dimension, shape, orientation, shear force, or flexural modulus upon application of an activation signal. Suitable active materials include, without limitation, shape memory alloys (SMA), ferromagnetic shape memory alloys, electroactive polymers (EAP), piezoelectric materials, magnetostrictive materials, magnetorheological elastomers, electrorheological elastomers, electrostrictive materials, and the like. Depending on the particular active material, the activation signal can take the form of, without limitation, an electric current, an electric field (voltage), a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

Figure 1:
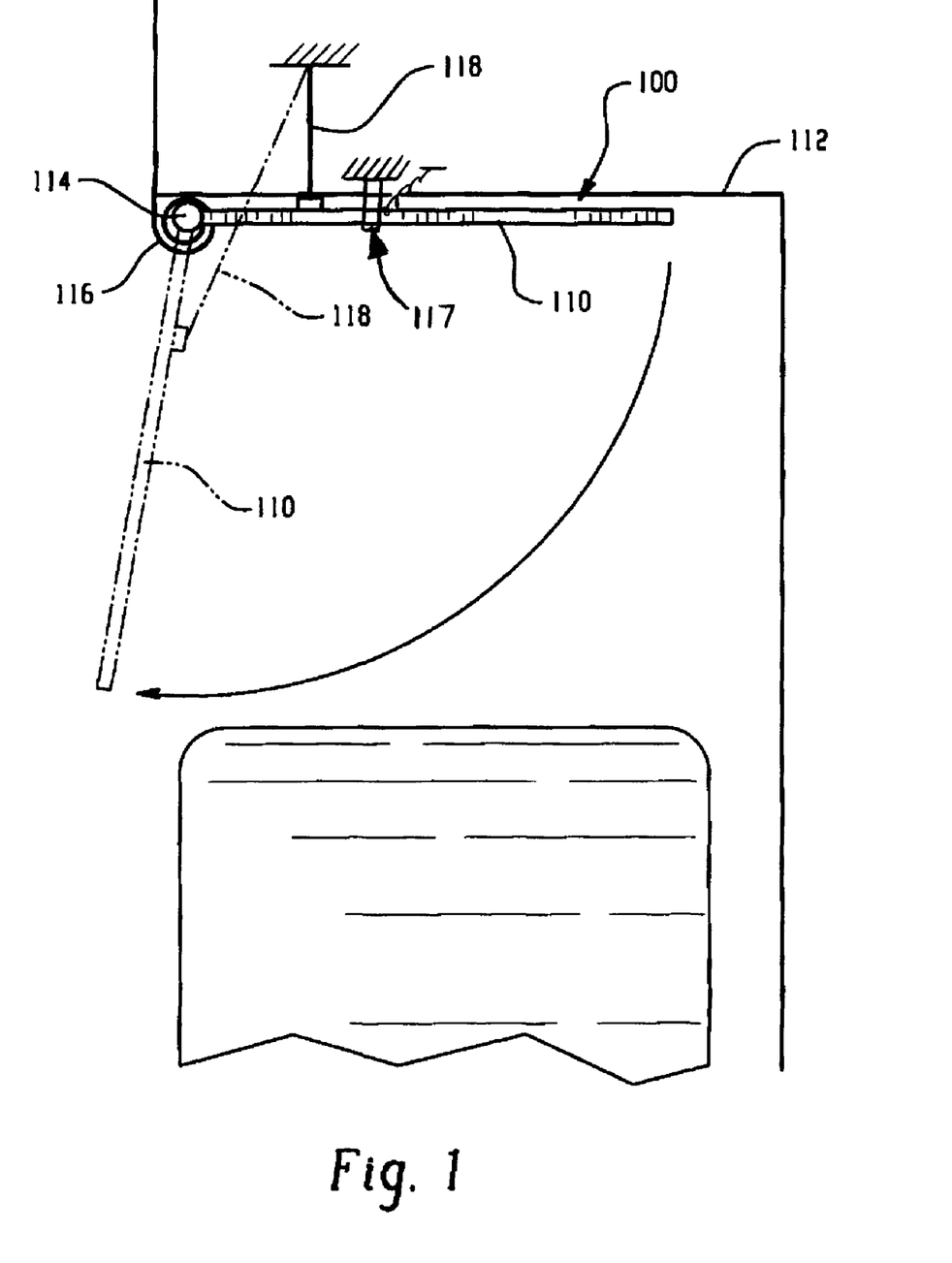
FIG. 1 is a perspective view of one embodiment of an active material actuated flow trip disposed in a vehicle wheel well.

Several embodiments of flow trips using active materials are disclosed below and are grouped into categories relating to the nature of the motion of the moveable body portion of the flow trip for ease in discussion. In each of the figures, the dashed lines are meant to indicate the flow trip in a deployed position and are used for ease in understanding the function of the application. FIGS. 1 through 5 illustrate the exemplary embodiments of these flow trip assemblies. This first embodiment, as illustrated in FIG. 1, shows an exemplary active material actuated flow trip, generally designated by reference numeral 100. The flow trip 100 is operatively connected to a vehicle body, e.g., a wheel well 112. The active material actuated flow trip is not intended to be limited to this particular embodiment nor is it intended to be limited to any specific active material therein. A moveable body portion 110 has one free end and one end fastened to a pivot 114. The pivot 114 is also in operative communication with a return mechanism, e.g., a rotary spring 116. An active material component 118 is in operative communication with the moveable body portion 110 and provides the actuation work to move the body portion. The change in a property of the active material component 118 can, for example, cause the rotation of the body portion 110 from an original position, (i.e., a stowed position and/or a planate position relative to the wheel well 112) into a position deployed within an airflow path of the vehicle (as shown by the dashed lines in FIG. 1). As used herein "planate" is intended to generally refer to a position where the moveable body portion of the flow trip is even with the vehicle body (i.e., blended into the vehicle lines), thereby providing a smooth plane from flow trip to vehicle body. Alternatively, the pivot 114 can itself incorporate an active material component to cause the rotation of the moveable body portion 110.

The moveable body portion 110 of the flow trip 100 can have a shape which starts tangent to and in the plane of the vehicle surface and bends or angles smoothly outward from the surface of the vehicle in the downstream direction. The disclosed flow trips are designed to curve fluid streamlines away from (above) and across indentations, cavities, and angled irregularities in the vehicle surface in a manner such that the streamlines return to and realign smoothly with the vehicle surface on the downstream side of such features. As used herein the terms "upstream" and "downstream" is intended to denote location based upon fluid flow, hence, a flow trip located upstream of a wheel in a wheel well would receive an airflow stream before it enters the wheel well, and would return the airflow stream to the vehicle body surface downstream of the wheel well. Advantageously, the disclosed flow trip is stowed and/or is planate when a vehicle is stationary or traveling at low speeds, but is deployed at highway speeds in order to reduce vehicle drag and improve fuel economy. The fuel economy of a vehicle, therefore, may be improved by incorporating the disclosed flow trips without sacrificing preferred vehicle body design patterns.

The activation signal provided to the active material may include a heat signal, a magnetic signal, an electrical signal, a pneumatic signal, a mechanical signal, and the like, or combinations comprising at least one of the foregoing signals, with the particular activation signal dependent on the materials and/or configuration of the active material. For example, a magnetic field may be applied for changing the property of the active material fabricated from magnetostrictive materials. A heat signal may be applied for changing the property of thermally activated active materials such as SMA. An electrical signal may be applied for changing the property of the active material fabricated from electroactive materials, piezoelectrics, and/or ionic polymer metal composite materials.

Desirably, the change in the property of the active material remains for the duration of the applied activation signal. In one embodiment, upon discontinuation of the activation signal, the property of the active material generally reverts to an unpowered form and returns substantially to its original property, thereby returning the body portion 110 to the original position in the wheel well 112. In an optional embodiment, the change in a property of the active material may remain upon discontinuing the activation signal. In this embodiment, the pivot 114 includes a return mechanism 116 to restore the body portion 110 to the original stowed position in the wheel well 112. As used herein, the term "return mechanism" generally refers to any component capable of providing a force opposite to a force provided by the active material, and includes, without limitation, springs, elastomers, additional active materials, and the like. The return mechanism 116 may, therefore, return the moveable body portion 110 to either of the deployed or the original positions. The active material is then capable of overcoming the force of the return mechanism when activated. In this manner, reversibility and multiple deployments of the flow trip can advantageously occur.

In yet another optional embodiment, a zero-power hold latching mechanism 117 is in operative communication with the moveable body portion 110. The latching mechanism 117 advantageously holds the body portion 110 in its deployed state even after the active material component 118 is deactivated. When it is desired, the latching mechanism 117 can be released and the return mechanism 116 or the active material component 118 can move the body portion 110 back to the stowed position. Alternatively, the zero-power hold latching mechanism 117 may be used to hold the body portion 110 in the stowed position when the active material component 118 is deactivated. In this manner, deployment of the flow trip 100 can occur when the latching mechanism 117 is released and the return mechanism 116 or the active material component 118 moves the body portion into the airflow stream. The latching mechanism 117 advantageously allows the flow trip to be held in a stationary position, whether deployed or stowed, without need for a continuous activation signal to be applied to the active material component. This can reduce power consumption by the flow trip, drain on the vehicle battery, and overall operational cost.

Even further, the flow trip may optionally include a plurality of active material based actuators at various points about its perimeter. Multiple actuators may provide increased stability, increased torsional stiffness, and the like.

Figure 2:
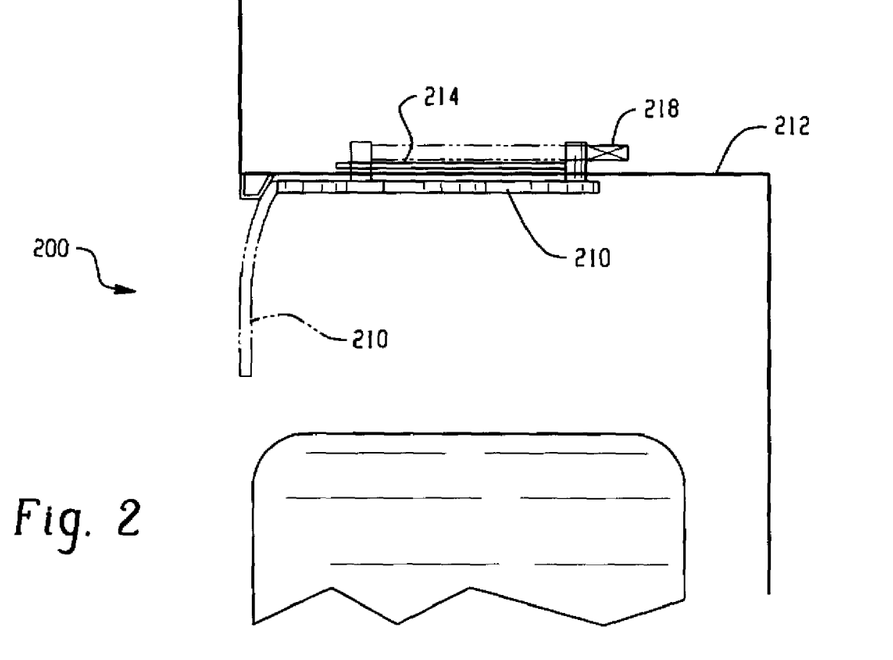
FIG. 2 is a perspective view of one embodiment of an active material actuated flow trip disposed in a vehicle wheel well.

As mentioned above, the following exemplary embodiments of flow trips use active material components to move the flow trip body through different types of motion. It is to be understood, that the function of each embodiment is to move the flow trip from an original position to a deployed position in a vehicle airflow stream. As such, these embodiments may include the optional components, e.g. latching mechanisms or return mechanisms, and operation methods as discussed in detail above. In FIG. 2, an active material actuated flow trip 200 is shown. The flow trip 200 is attached to a vehicle body, e.g., a wheel well 212 and includes a moveable body portion 210 that is deployed along a track 214 using linear motion. The linear motion can be created using various active materials directly, or an assembly of active materials and mechanisms which produce the desired motion. In this embodiment, a moveable body portion 210 is a passive flexible body, which is caused to bend by the linear displacement caused by a change in a property of an active material component 218, and provides the desired flow trip properties in this bent position.

Figure 3:
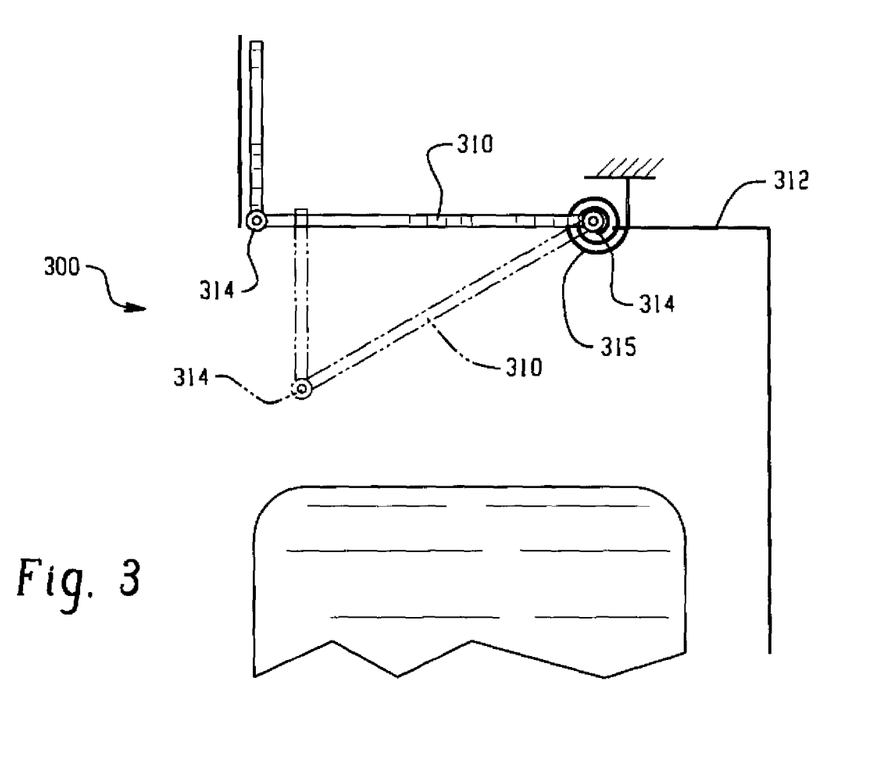
FIG. 3 is a perspective view of one embodiment of an active material actuated flow trip disposed in a vehicle wheel well.

FIG. 3 depicts an active material actuated flow trip 300 attached to a vehicle body, e.g., a wheel well 312. The flow trip 300 includes two pivots 314 to provide a near linear deployment of a moveable body portion 310. The actuation of the pivots 314 is accomplished using active materials connected directly to the movable body portion of the assembly or incorporated in an actuator-hinge of the assembly, as will be discussed in greater detail below. In this particular embodiment, an optional active material based spring 315 is disposed about the pivot 314 to effect movement of the body portion 310. Another optional feature of this embodiment has the moveable body portion 310 disposed flush with the wheel well 312 such that the moveable body portion 310 is actually part of the wheel well 312, rather than the body portion being an additional component disposed over the wheel well face.

Figure 4:
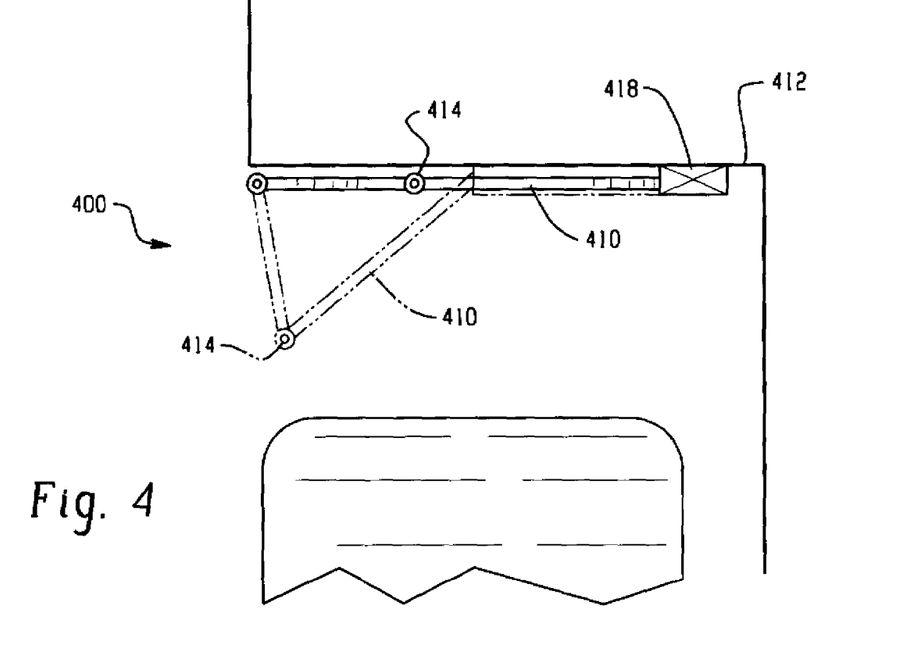
FIG. 4 is a perspective view of another embodiment of an active material actuated flow trip disposed in a vehicle wheel well.
Figure 5:
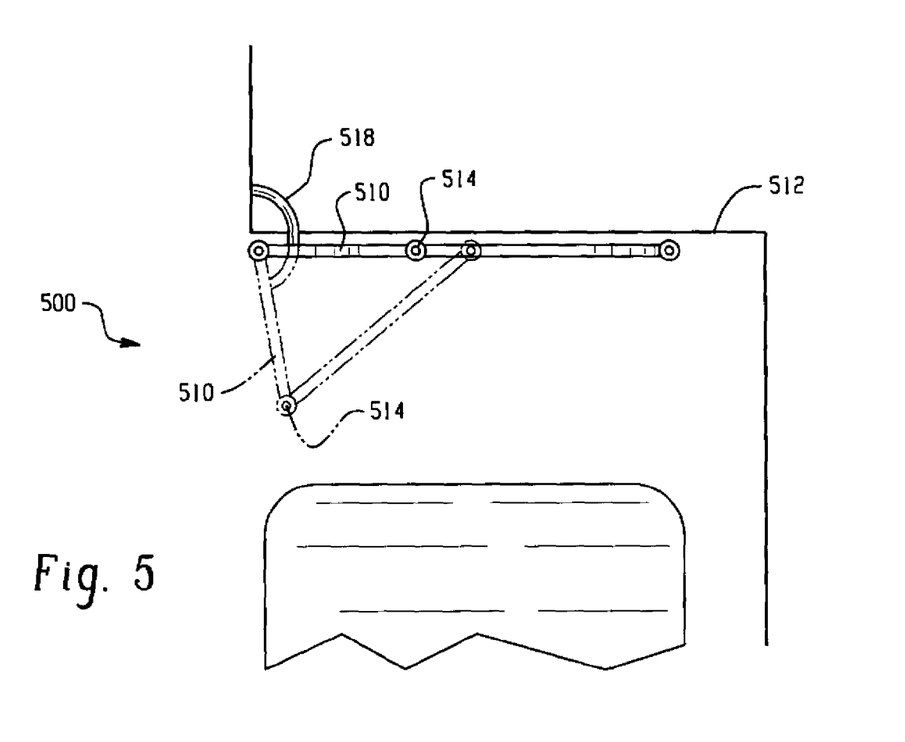
FIG. 5 is a perspective view of yet another embodiment of an active material actuated flow trip disposed in a vehicle wheel well.

In FIG. 4, an active material actuated flow trip 400 is shown attached to a vehicle body, e.g., a wheel well 412. The flow trip 400 includes a combination of a linear displacement active material actuator 418 and a pivot 414 to provide deployment of the moveable body portion 410 using rotation. In this embodiment the actuation is accomplished by driving the linear displacement of the moveable body portion such that rotation of the flow trip portion is achieved. FIG. 5 shows an active material actuated flow trip 500 attached to a vehicle body, e.g., a wheel well 512. The flow trip 500 includes an active material component 518 configured to rotate a moveable body portion 510 through a change in a property of the active material, wherein the body portion 510 is connected to the vehicle body 512 and the active material component 518 by a pivot 514.

To better illustrate the use of active materials in the above disclosed reversibly deployable flow trip embodiments, disclosed below are several specific embodiments of active material actuators, shown in FIGS. 6 through 11. Two exemplary actuators are shown in FIGS. 6 and 7 and are portrayed in isolation (i.e., not as part of a flow trip assembly), to better describe the details of each actuator. But it is to be understood, however, that among other applications these actuators are beneficial in flow trip applications. FIGS. 8 through 11 illustrate various active material components as attached to the flow trip 300, shown in FIG. 3. It is to be understood, however, that the active material actuators described therein can be used with any of the disclosed flow trip embodiments represented in FIGS. 1 through 5, and that one of skill in the art will understand the performance tradeoffs that are incurred resulting from the specific design decisions.

Figure 6A:
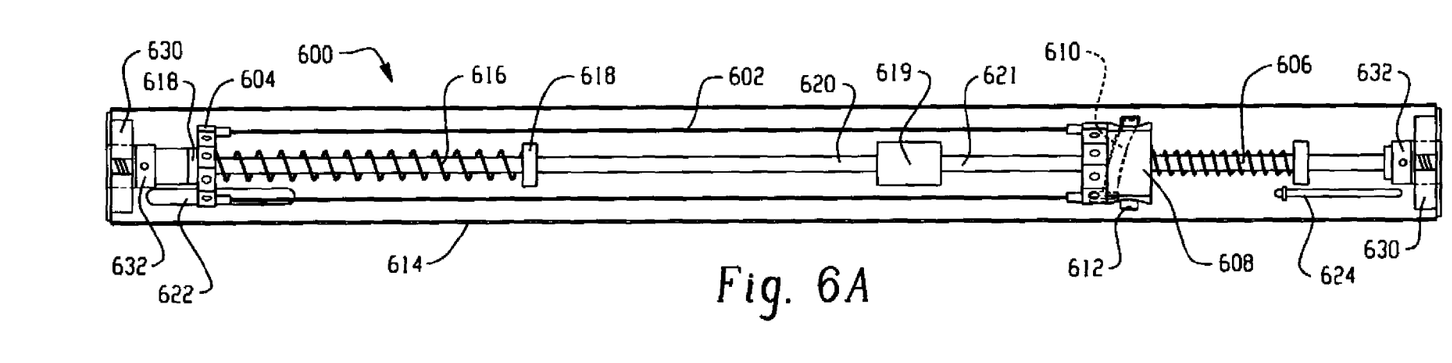
FIGS. 6A and 6B present perspective views of one embodiment of (A) an active material based actuator with a detailed view of (B) the conversion mechanism.
Figure 7:
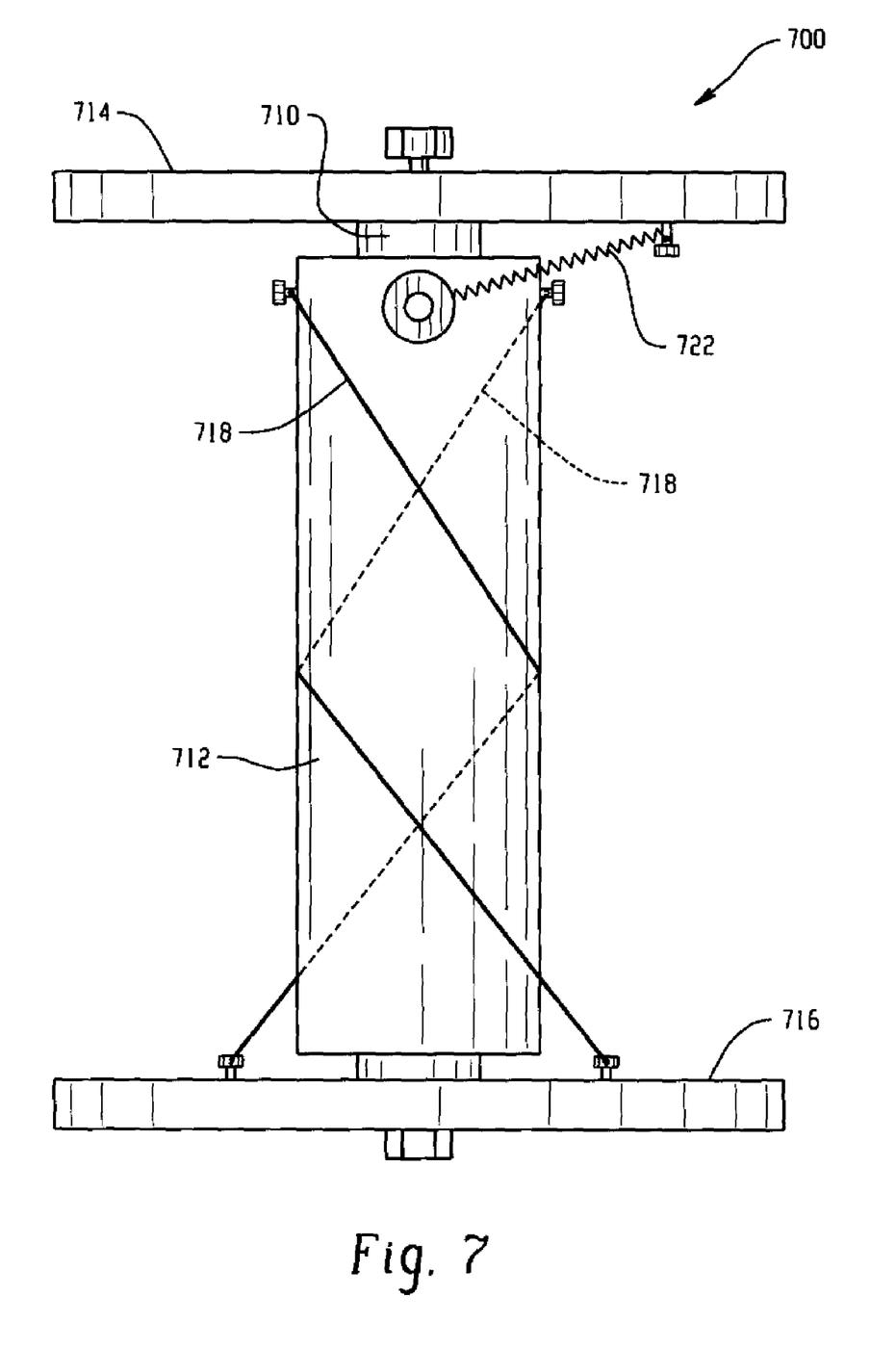
FIG. 7 is a perspective view of one embodiment of an active material based actuator.

FIG. 6 illustrates an active material rotary actuator-hinge assembly 600 for use as an actuator in a vehicle flow trip application. The actuator 600 includes a linear displacement active material 602 (preferably SMA wire), and a mechanical anchor 604 attached to one end of the active material 602. A bias spring 606 applies a force to torque a pivot assembly 608. The pivot assembly 608 has radial output shafts 612, which are guided by slots 610 in the outer actuator covering 614. In operation, electrical heating of the SMA wire 602 causes a martensite to austenite transformation that induces a length change, e.g., a contraction, of the wire as great as about 10 percent at the pivot assembly 608. In response to the contracting SMA wire 602, the attached radial output shaft 612 moves axially in the center column 621 and rotates or slides relative to slot 610. The angled shape of the slot 610 causes the outer actuator covering 614 to rotate until the axial motion of the output shaft 612 is complete. As the SMA wire 602 cools below the transformation temperature, the bias spring 606 extends the SMA wire 602 back to the original precontracted length. A mechanical anchor 632 or the outer actuator covering 614, which are in communication via the bearing or collar 630, can serve as the relative mechanical reference. Optionally, the actuator 600 can also have a force overload spring 616, adjustable hard stop collars 618, and center shafts 620 and 621, which shafts are electrically isolated from one another by an electrical isolator 619. The outer covering 614 of the actuator 600 can further optionally include air cooling vents 622 and service access holes 624 at any location and in any direction along the body.

The linear displacement active material 602 can have any suitable form, such as wires, springs, tubes, foils, strips, bundles of wires, or subdivisions and combinations of any of the foregoing forms. These forms can be in mechanical series or parallel configurations and furthermore can be electrically arranged in series or parallel configurations. Preferably, the linear displacement active material 602 takes the form of an SMA wire. When desirable, however, alternative active material forms can provide different force/displacement properties, electrical load properties, thermal behavior properties, cycle times, and the like, to the actuator 600. The particular form of active material 602 is determined by the flow trip application or other requirements, such as electrical, mechanical, robustness, packaging size, cost and weight, and the like.

These different requirements may be achieved by subdividing the active material 602 into multiple portions. Subdivisions and/or combinations of active material can provide additional desirable device benefits, such as improved package size, reduced weight, increased design scalability, larger angular displacements or torques, a digital or step-like actuation, a stacked or staggered actuation to improve controllable resolution, an active reset spring, or differential actuation via antagonistic wire configurations.

For tailored force and displacement performance of the active material 602, the subdivisions may be directly anchored by the mechanical anchor 604. From this mechanical reference though, the active material subdivisions may be configured electrically or mechanically in series or parallel and mechanically connected in telescoping, stacked, or staggered configurations. The electrical configuration may be modified during operation by software timing, circuitry timing, and external or actuation induced electrical contact.

The bias spring 606 can be employed to provide a restoring force to the active material 602. The bias spring 606 can be any form that provides the relevant force and displacement characteristics required to restore the active material to its preactivated form. The spring 606 may be an elastic material, a linear spring, a non-linear spring, a Belleville, a leaf spring, an antagonistic active material wire, and the like. The spring 606 may further include multiple springs in series or parallel. The bias force and displacement are chosen to match the actuation characteristics of the active material and are set by adjustable hard stop collars 618. Suitable hard stops can include dowel pins, nuts, set-screws, screws, and the like.

Figure 6B:
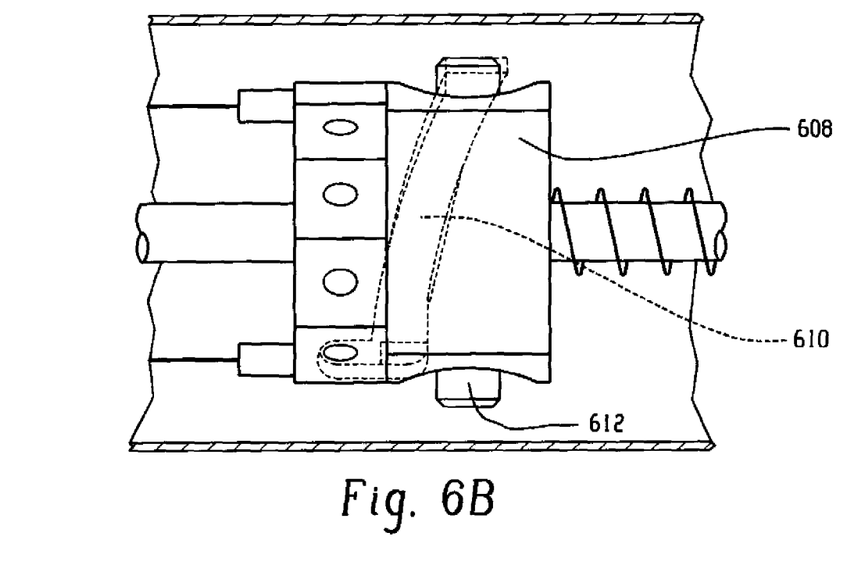

FIG. 6B is included to more clearly show the conversion mechanism, where the pivot assembly 608, the slot 610, and the radial output shaft 612 interrelate to convert the axial movement to a rotational torque of the covering. The torque and rotation performance of the rotary actuator 600 may be adjusted by varying the slot 610 angle, slot 610 friction, or by having curvilinear or multiple slots. Also, having rotation amplification schemes such as gears, cams, or ratcheting from multiple actuations can vary the torque and rotation performance of the actuator 600. Moreover, adding notches in the slot 610 to provide detent functions, or having active material based pawls for deterministic unlatching of ratchets and detents, can further provide variability to the actuator 600. Additionally, the use of the radial output shaft 612 and slot 610 for the pivot assembly 608 necessitates the use of at least a partial outer actuator covering 614. The function of the covering 614 is to transmit axial and torque toads, which can be performed by a variety of different cross section forms, such as circular, channel, truss-like, square, and the like.

The outer covering 614 may further optionally have conduits, vents 622, holes, gaps, valves to aid in heating or cooling, and the like. These optional features permit passive heat transfer control or active heat transfer control using separate devices or on-board heating/cooling devices. Heating is provided primarily by the electrical resistance heating of the active material wire 602. However, other active on-board methods of heating may be used, such as waste heating from the exhaust and cabin heating from the cabin climate control system. The heat from such methods can be transferred to the actuator 600 through valves in the outer covering 614, for example. Passive cooling may also be provided via a heat pipe, thermoelectric conduction, free convection vents in the outer covering, forced convection via fans, other moving fluids in open or closed loop systems, and the like.

The optional force overload spring 616 of actuator 600 provides a method of preserving the actuation authority of the active material. When excessive external torque is applied to the actuator, which the active material 602 is not designed to handle, the overload spring 616 accommodates the excessive force by allowing motion of a mechanical wire anchor 604. The preload and hard stops for the overload spring 616 are provided by the adjustable hard stop collars 618.

The actuator 600 may further include center shafts 620 and 621 to provide axial rigidity and a mechanical reference for the actuator. Dividing the shaft into two electrically isolated portions by a spacer 619 permits the mechanical attachment to also be the electrical attachment.

FIG. 7 illustrates another exemplary embodiment of an active material actuator for use with a flow trip, generally designated 700. The actuator 700 is configured to convert a tensile force generated by active material wires into rotary motion by generating torque between a fixed and movable component. The actuator 700 has two concentric cylinders. The first cylinder comprises a rod 710. The second cylinder comprises a tube 712 disposed concentrically about the rod 710. Two discs 714 and 716 are disposed at either end of the rod 710. Active material wires 718 are wrapped around the length of the tube 712 and attached to the disc 716. The number of active material wires used and the number of turns of each wire around the tube 712 relate to the rotation and torque requirements of the actuator 700 and may be determined by those skilled in the art. A return mechanism 722 is operatively connected to the tube 712 and the disc 714. Alternatively, the return mechanism may be integrated into the concentric cylinders of the rod/tube assembly, or may be provided by loads incurred during use of the actuator in flow trip applications. Optionally, brackets (not shown) may be attached to the actuator 700 to hingeably connect a moveable body portion to a vehicle, thereby forming a complete active material actuated flow trip assembly.

In one mode of operation, the two discs 714 and 716 of the actuator 700 are stationary. An activation signal is sent to the active material. Active material 718 is activated by the signal to cause a change in a property, e.g., a length of the active material wire. The change causes a rotational bias to the tube 712 relative to the rod 710. The return mechanism 722 is operable to return the tube 712 to the initial position upon deactivation of the active material wire 718. In this mode of operation, the actuator 700 is capable of producing a rotation of about 0 degrees to at least about 180 degrees to a body portion of a flow trip.

In another mode of operation, only one disc (e.g., 714) of the actuator 700 is stationary. An activation signal is first sent to the active material wire 718 to cause a change in a property of the active material and rotate the disc 716 relative to the rod 710, the tube 712, and the disk 714. The return mechanism 722 is operable to return the disc 716 to the initial position upon deactivation of the active material wire 718. In this mode of operation, the actuator 700 is capable of converting the linear displacement of the active materials to angular displacement of a body portion in physical communication with the disc 716. Advantageously, the actuator 700 may provide a full range of deflection angles for a flow trip in an airflow path. Moreover, because the actuator is not based on incremental movements of several active material segments or incremental movements produced by multiple activations of a single segment, the flow trip may be deployed and returned planate faster than prior art active material actuators.

Figure 8:
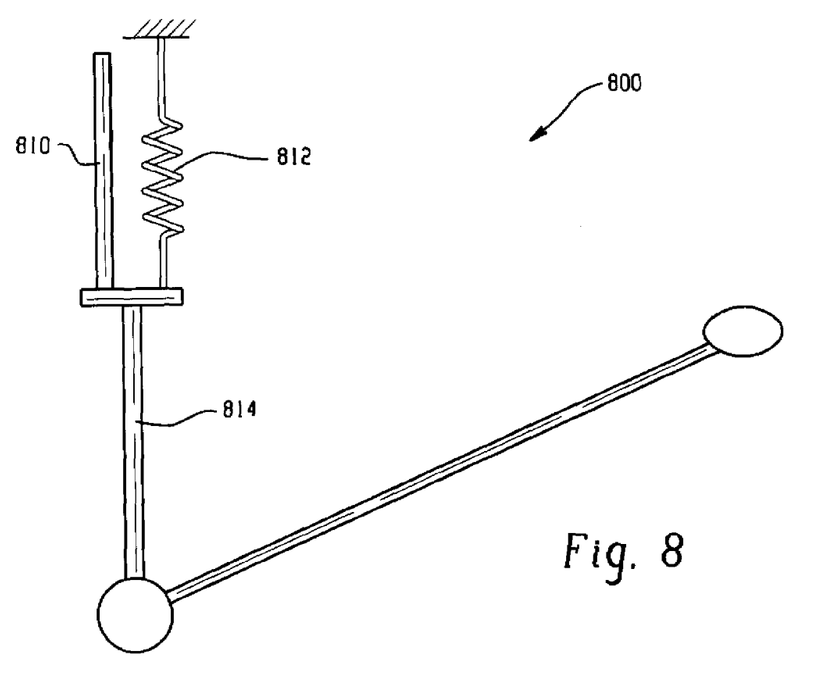
FIG. 8 is a perspective view of another embodiment of an active material actuated flow trip.

More exemplary active material actuated flow trip embodiments of the flow trip assembly 300 as embodied in FIG. 3, are illustrated in FIGS. 8 through 11. For example, FIG. 8 depicts an exemplary flow trip 800. An active material 810, e.g., a dielectric elastomer sheet, and a return mechanism 812, e.g., a linear spring, are coupled to and in operative communication with a moveable body portion 814. The dielectric sheet 810 is configured so that activation of the active material results in linear deployment of the moveable body portion

814. Upon deactivation of the dielectric elastomer, the moveable body portion 814 is retracted linearly. Optionally, the linear spring 812 can retract the body portion 814. While the previous description specifically refers to dielectric elastomer type active materials, to those skilled in the art, other active materials capable of producing large linear displacements could be substituted to provide similar functionality.

Figure 9:
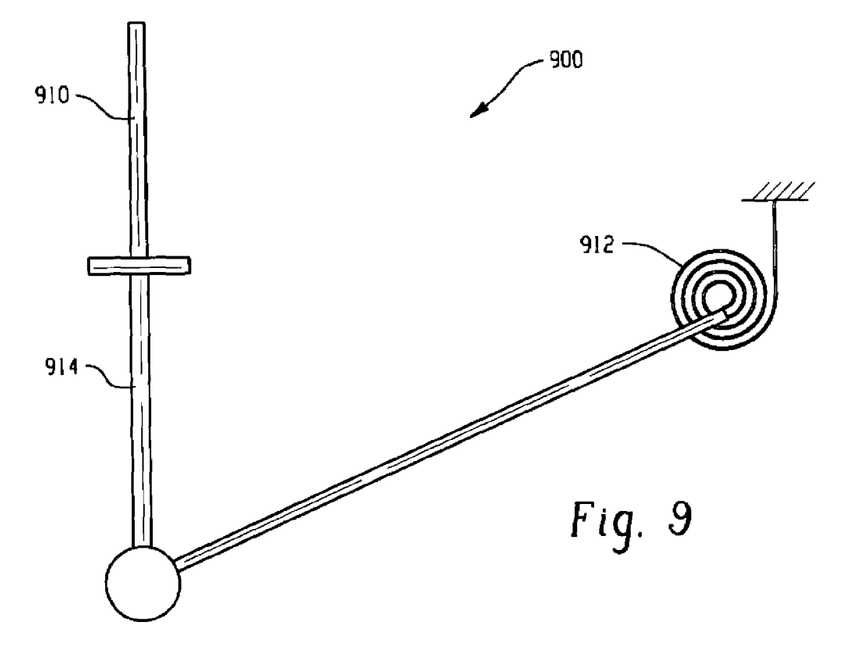
FIG. 9 is a perspective view of another embodiment of an active material actuated flow trip.

In FIG. 9, an exemplary flow trip 900 is illustrated. An active material 910, e.g., a dielectric sheet, and a return mechanism 912, e.g., a torsion spring, are coupled to and in operative communication with a moveable body portion 914. The dielectric sheet 910 is configured to rotationally displace the moveable body portion 914 upon activation, and the torsion spring 912 is structured to provide a bias force for returning the moveable body portion 914 to the original position upon deactivation of the dielectric sheet 910.

Figure 10:
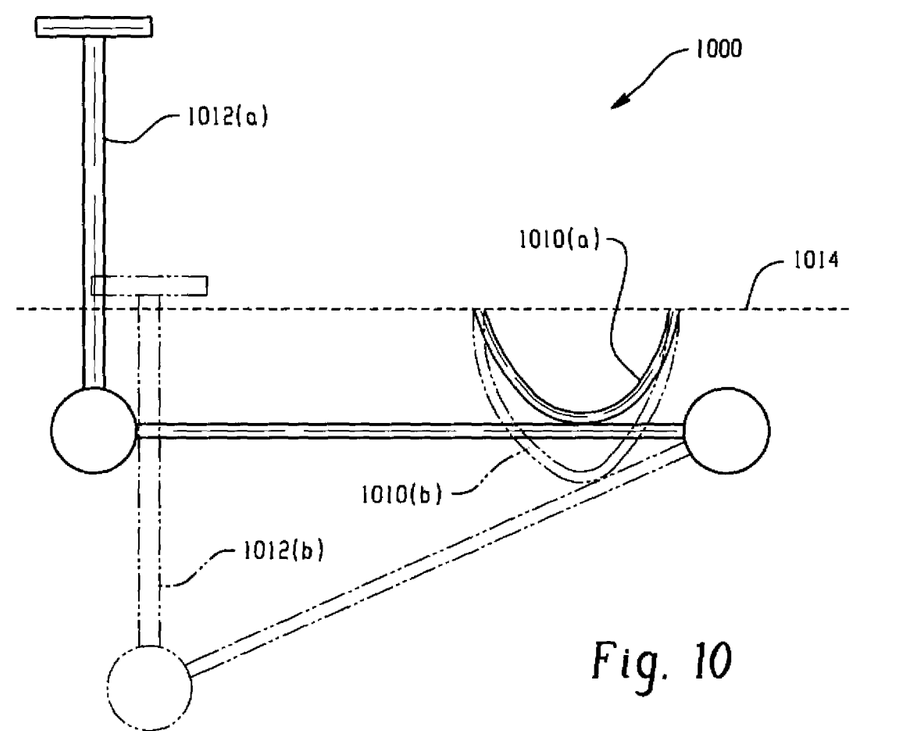
FIG. 10 is a perspective view of another embodiment of an active material actuated flow trip.

In FIG. 10, an exemplary flow trip 1000 is illustrated. FIG. 10 depicts the flow trip 1000 in both a stowed and deployed position. An active material 1010(*a*) is coupled to and in operative communication with a moveable body portion 1012(*a*). The moveable body portion 1012(*a*) is attached to a vehicle body 1014. The active material 1010(*a*) undergoes a change in a property upon receipt of an activation signal, thereby bending to a position depicted by 1010(*b*). The activation of the active material 1010 rotationally displaces the moveable body portion 1012(*a*) from a stowed position relative to the vehicle body 1014 to a deployed position in a vehicle airflow path, 1012(*b*). Upon deactivation of the activation signal, active material 1010(*b*) is structured to return to its original form as depicted in 1010(*a*), thereby returning the moveable body portion 1012(*b*) to the original stowed position, 1012(*a*).

Figure 11:
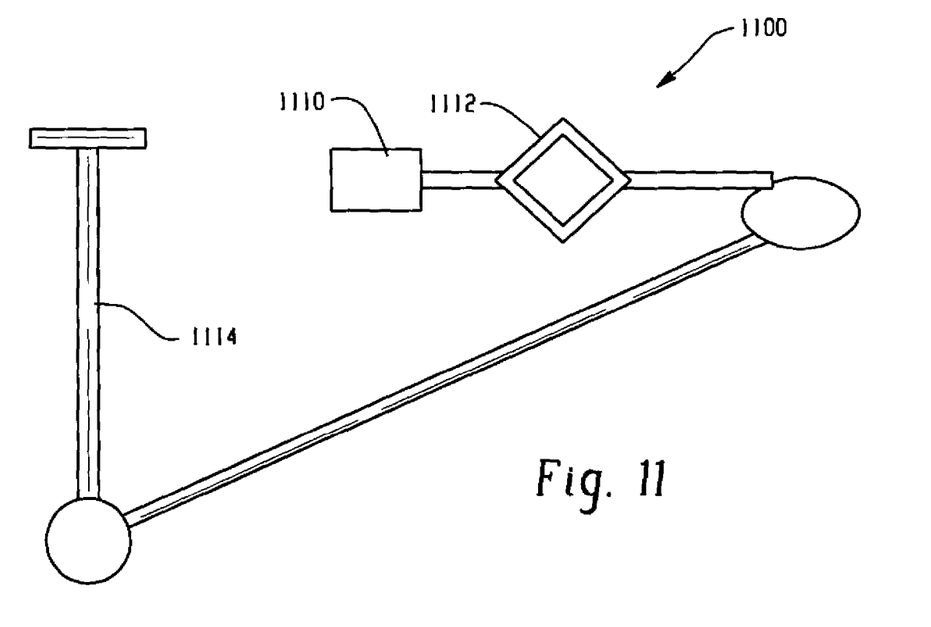
FIG. 11 is a perspective view of another embodiment of an active material actuated flow trip.

Another exemplary flow trip 1100 is illustrated in FIG. 11. An active material 1110, e.g., a piezoelectric material, is coupled to and in operative communication with a stroke amplifier 1112 and a moveable body portion 1114. The piezoelectric material 1110 and stroke amplifier 1112 are structured to rotationally displace the moveable body portion 1114 upon activation and return the body portion to the original position upon deactivation.

The process of using a vehicle flow trip generally comprises disposing an active material based actuator intermediate a moveable body portion and a vehicle body. When the vehicle is stationary, i.e., parked, or traveling at slow speeds where airflow drag has minimal effect on fuel economy, the flow trip is turned off and in a position aligned or tucked into the body structure. Optionally, when the vehicle reaches a certain predetermined speed, where airflow drag begins to affect fuel economy, an activation signal can be configured to activate the active material. The activation signal effects a change in a property of the active material, wherein the change rotationally displaces the moveable body portion from an original position that is stowed and/or planate relative to the vehicle body, to a position in the vehicle's airflow path. The flow trip can then be held in this position by either maintaining the activation signal or by engagement of a zero-power hold latching mechanism, the activation signal being turned off once the latch is engaged. The flow trip, in this deployed position, can improve the vehicle's aerodynamics thereby reducing airflow drag and ultimately improving fuel economy. When the vehicle stops or substantially reduces speed, the active material can be deactivated or the latch disengaged and the moveable body portion can return to the original (stowed and/or planate) position, where the vehicle will maintain the visual appeal intended by design. Returning the moveable portion to the original position can be accomplished with a return mechanism, which provides a force opposite to the force provided by the active material, or the active material itself can return the body portion via a reverse in the change in property. The process may be repeated any number of desired times to improve fuel economy throughout the life of the vehicle.

As previously described, suitable active materials for actuating the flow trips include, without limitation, shape memory alloys (SMA), electroactive polymers (EAP), electrostrictive materials, magnetostrictive materials, piezoelectric materials, ferromagnetic materials, magnetorheological elastomers (MR) and electrorheological elastomers (ER).

SMA exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the SMA are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with SMA is a thermal activation signal having a magnitude to cause transformations between the martensite and austenite phases.

The temperature at which the SMA remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like.

Selection of a suitable shape memory alloy composition depends on the temperature range where the component will operate.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

FSMA are alloys; often composed of Ni—Mn—Ga, that change shape due to strain induced by a magnetic field. FSMA have internal variants with different magnetic and crystallographic orientations. In a magnetic field, the proportions of these variants change, resulting in an overall shape change of the material. An FSMA actuator generally requires that the FSMA material be placed between coils of an electromagnet. Electric current running through the coil induces a magnetic field through the FSMA material, causing a change in shape.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Advantageously, the above noted active material actuated flow trips and processes provide a vehicle with reduced airflow drag and improved fuel economy when driving, while maintaining the aesthetic appeal of smooth, flush vehicle bodylines when stationary. Moreover, because the active material based actuators provide large body rotation/displacement with minimum actuation times, they can reduce weight, size, and noise over the prior art flow trip actuators without sacrificing performance. Furthermore, it should be recognized by those skilled in the art that the active material actuated flow trips may be configured for attachment of any hinged panel to the vehicle body.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle flow trip, comprising:
    a moveable body portion in physical communication with a vehicle body; and
    an actuator comprising an active material in operative communication with the vehicle body and the moveable body portion;
    wherein the active material undergoes a change in a property upon receipt of an activation signal, wherein the change in a property is effective to displace the moveable body portion from either an original position or a deployed position in an airflow stream to the other of the original or the deployed position through motion of the actuator,
    wherein the actuator further comprises a tube disposed concentrically about a rod, wherein the rod has a disc disposed at each end, wherein the active material is disposed about the rod and attached to the disc and is configured to cause a rotational bias to the tube relative to the rod upon receipt of the activation signal.

2. The vehicle flow trip of claim 1, wherein the active material comprises, a shape memory alloy, an electroactive polymer, a magnetorheological elastomer, a piezoelectric material, a magnetostrictive material, an electrostrictive material, an electrorheological elastomer, a ferromagnetic shape memory alloy, or a combination comprising at least one of the foregoing active materials.

3. The vehicle flow trip of claim 1, wherein the change in a property comprises a change in a dimension, a shape, a shear force, a shape orientation, a flexural modulus, or combinations comprising at least one of the foregoing properties.

4. The vehicle flow trip of claim 1, wherein the activation signal comprises a thermal activation signal, an electric activation signal, a magnetic activation signal, a chemical activation signal, a mechanical load, or a combination comprising at least one of the foregoing activation signals.

5. An active actuator-hinge assembly for a vehicle flow trip, comprising:
    a linear displacement active material disposed in an actuator covering, wherein the active material is configured to undergo a change in a property upon receipt of an activation signal;
    a radial output shaft in operative communication with the linear displacement active material, wherein the change in the property of the active material is effective to provide axial movement of the radial output shaft; and a pivot assembly, in operative communication with the radial output shaft and the actuator covering, configured to convert the axial movement of the output shaft to a rotational motion of the actuator covering,
    wherein the actuator covering comprises an angled slot wherein the radial output shaft moves in the angled slot to effect the rotational motion of the actuator covering.

6. The active actuator-hinge assembly of claim 5, wherein the active material comprises, a shape memory alloy, an electroactive polymer, a magnetorheological elastomer, a piezoelectric material, an electrostrictive material, a magnetostrictive material, an electrorheological elastomer, a ferromagnetic shape memory alloy, or a combination comprising at least one of the foregoing active materials.

7. The active actuator-hinge assembly of claim 5, wherein the change in the property comprises a change in a dimension, a shape, a shear force, a shape orientation, a flexural modulus, or combinations comprising at least one of the foregoing properties.

8. The active actuator-hinge assembly of claim 5, wherein the activation signal comprises a thermal activation signal, an electric activation signal, a magnetic activation signal, a chemical activation signal, a mechanical load, or a combination comprising at least one of the foregoing activation signals.

9. The active actuator-hinge assembly of claim 5, further comprising a return mechanism disposed inside the actuator covering and in operative communication with the pivot assembly, wherein the return mechanism is configured to restore the active material to a condition before the change in the property.

* * * * *